Figure 1:
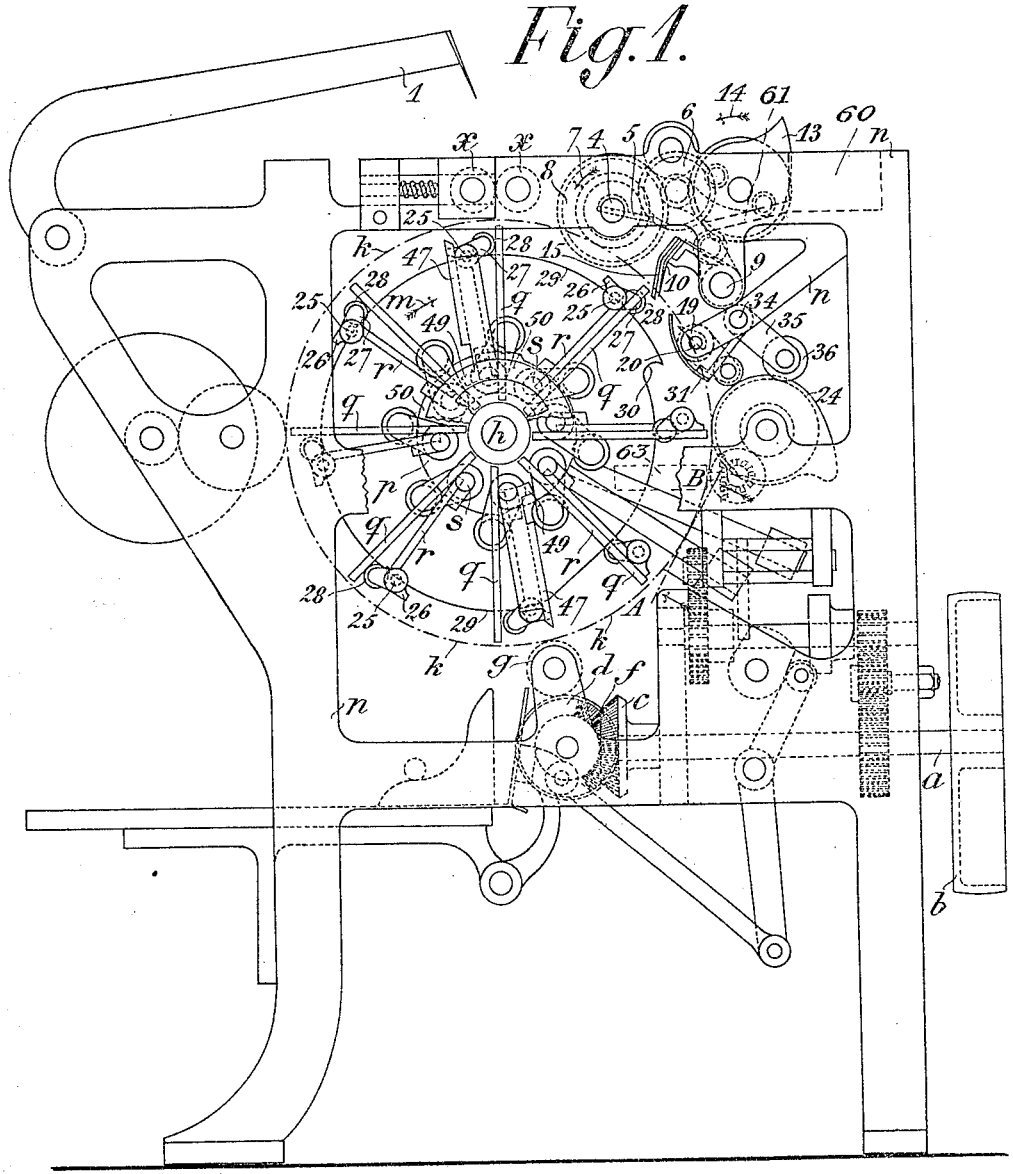

B. J. JENSEN.
MACHINE FOR MANUFACTURING PAPER BAGS AND THE LIKE.
APPLICATION FILED AUG. 4, 1906.

926,422.

Patented June 29, 1909.

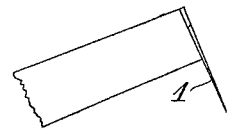
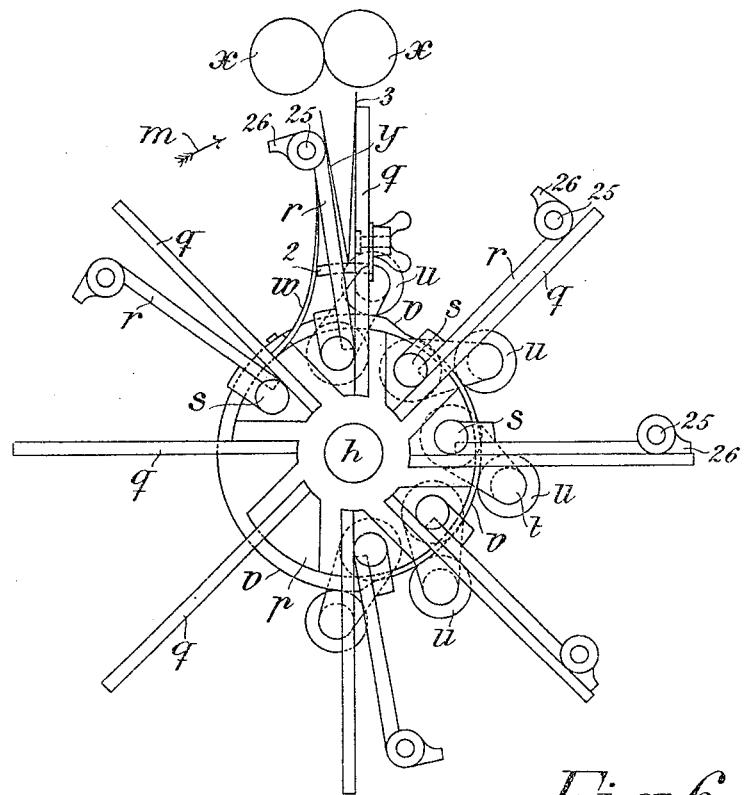
Fig. 2.
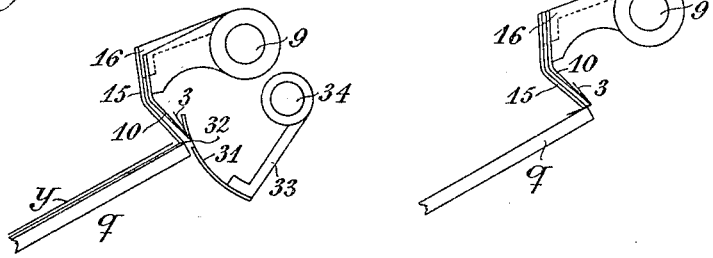
Fig. 5.  Fig. 6.

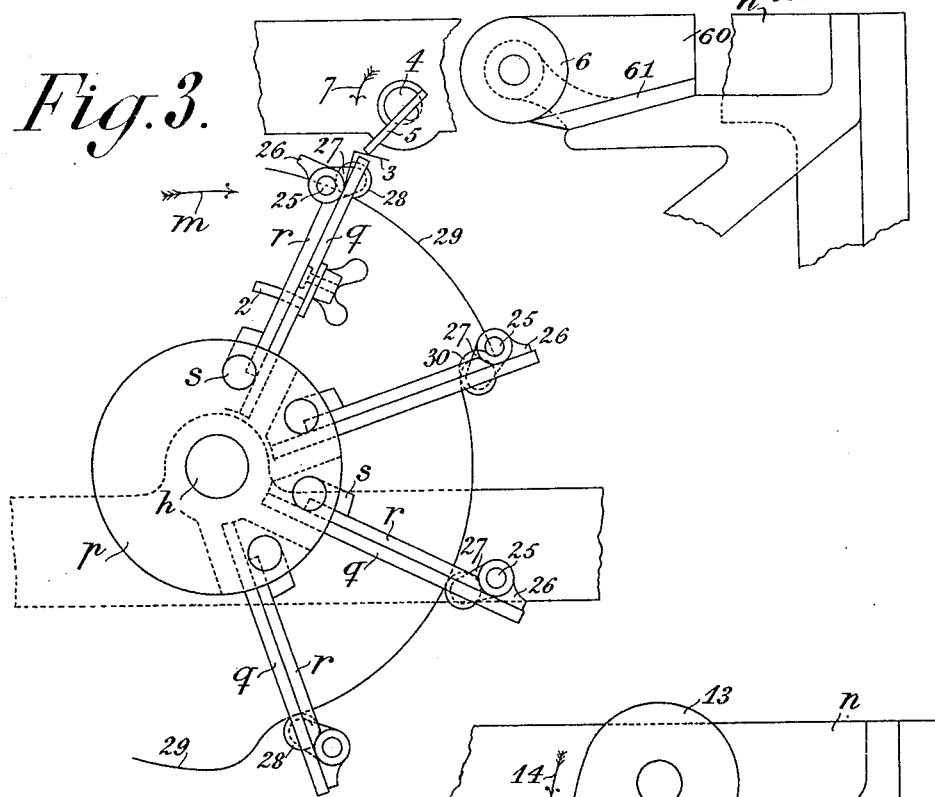
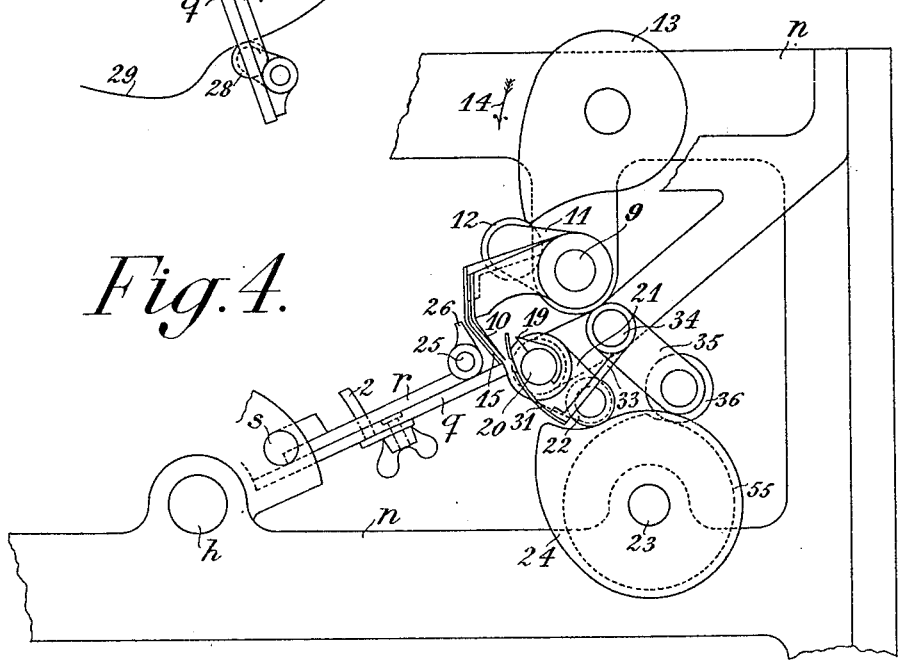

B. J. JENSEN.
MACHINE FOR MANUFACTURING PAPER BAGS AND THE LIKE.
APPLICATION FILED AUG. 4, 1906.
926,422.
Patented June 29, 1909.
6 SHEETS—SHEET 4.
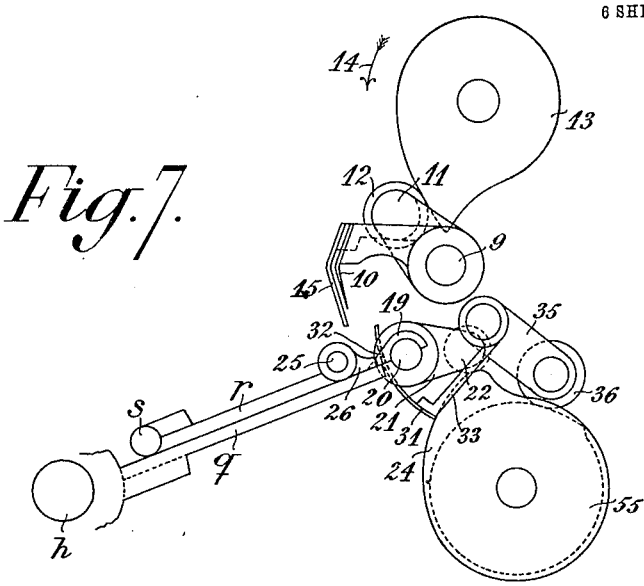
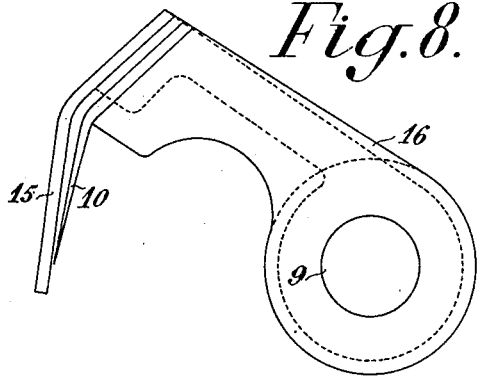 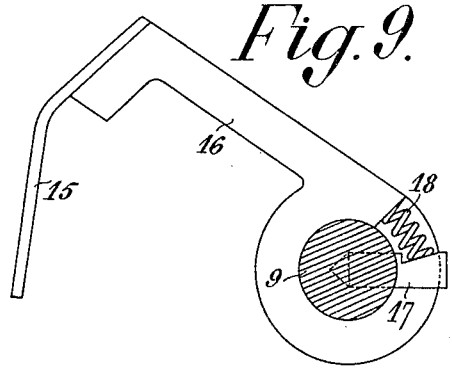
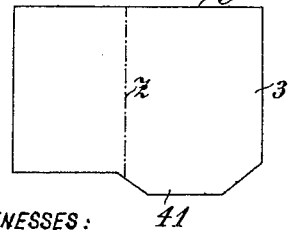 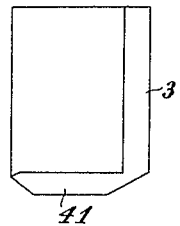 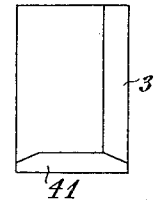
WITNESSES:
INVENTOR
Bernhardt Johan Jensen
BY
ATTORNEYS.
THE NORRIS PETERS CO., WASHINGTON, D. C.

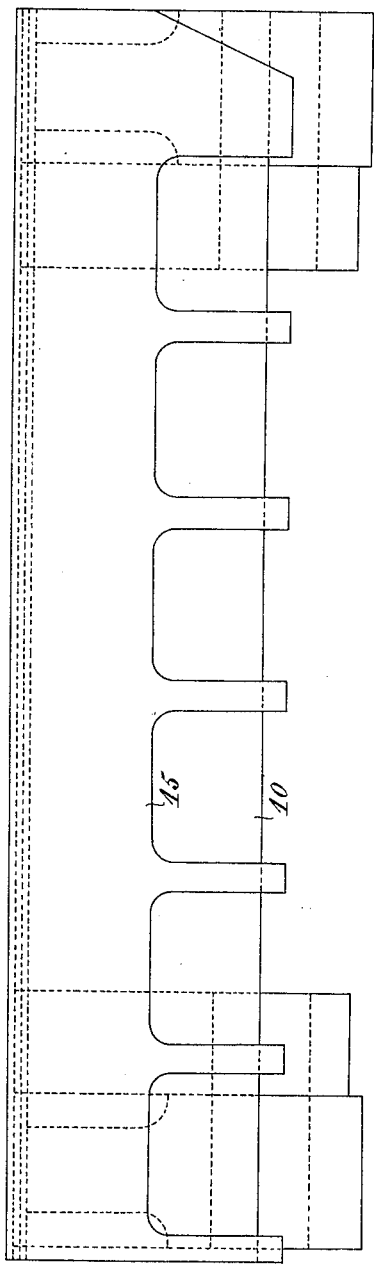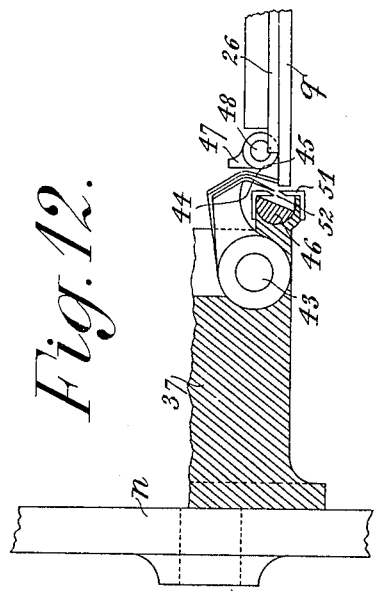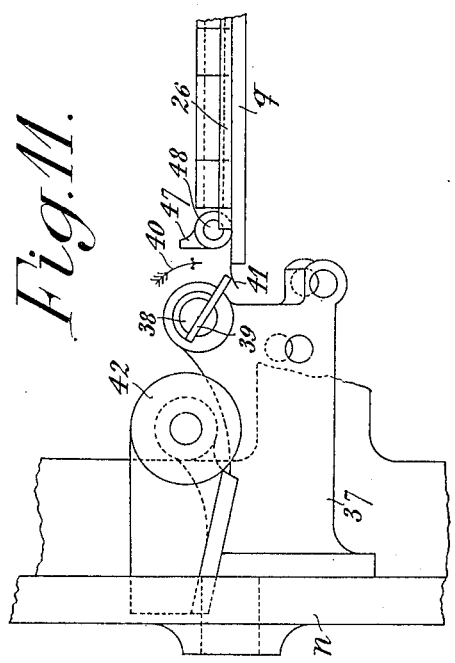

B. J. JENSEN.
MACHINE FOR MANUFACTURING PAPER BAGS AND THE LIKE.
APPLICATION FILED AUG. 4, 1906.

926,422.

Patented June 29, 1909.

UNITED STATES PATENT OFFICE.

BERNHARDT JOHAN JENSEN, OF COPENHAGEN, DENMARK.

MACHINE FOR MANUFACTURING PAPER BAGS AND THE LIKE.

No. 926,422.      Specification of Letters Patent.      Patented June 29, 1909.

Application filed August 4, 1906. Serial No. 329,141.

*To all whom it may concern:*

Be it known that I, BERNHARDT JOHAN JENSEN, a citizen of the Kingdom of Denmark, residing in Godthaabsvej 42, Copenhagen, in the Kingdom of Denmark, engineer, have invented new and useful Improvements in Machines for Manufacturing Paper Bags and the Like, of which the following is a specification.

This invention relates to machines for manufacturing paper bags and the like, and has as its object to generally improve the construction and increase the capacity of machines of this type.

More specifically the invention aims to provide a machine in which the sheets or blanks, after having been folded into two parts, are caught by suitable devices mounted on a continuously moving element and while held by said devices are formed into complete bags. The machine is particularly adapted for making bags having a bottom and side fold, and a construction is provided whereby both of these folds are made by improved mechanism while the sheet is held by the devices just mentioned.

The continuously moving element preferably takes the form of a rotary shaft upon which are arranged radially a series of relatively stationary and movable plates between which the sheets are grasped after having been folded into two parts by means of feed-rollers or other suitable mechanism. Means are provided for actuating the movable plates at the proper time for grasping the sheet and there are mounted on the movable plates and on fixed parts of the machine the instrumentalities for creasing the overlapping side and bottom flaps of the sheet, gluing the same and finally folding them down in position. The various devices are operated from the rotary shaft alluded to by positive mechanism, and the requisite operations follow each other in such sequence that a bag is formed from each sheet during a semi-revolution of the shaft, the finished bag then falling out from between its corresponding retaining - plates. Accordingly in a given time a large number of bags can be manufactured.

Figure 13:
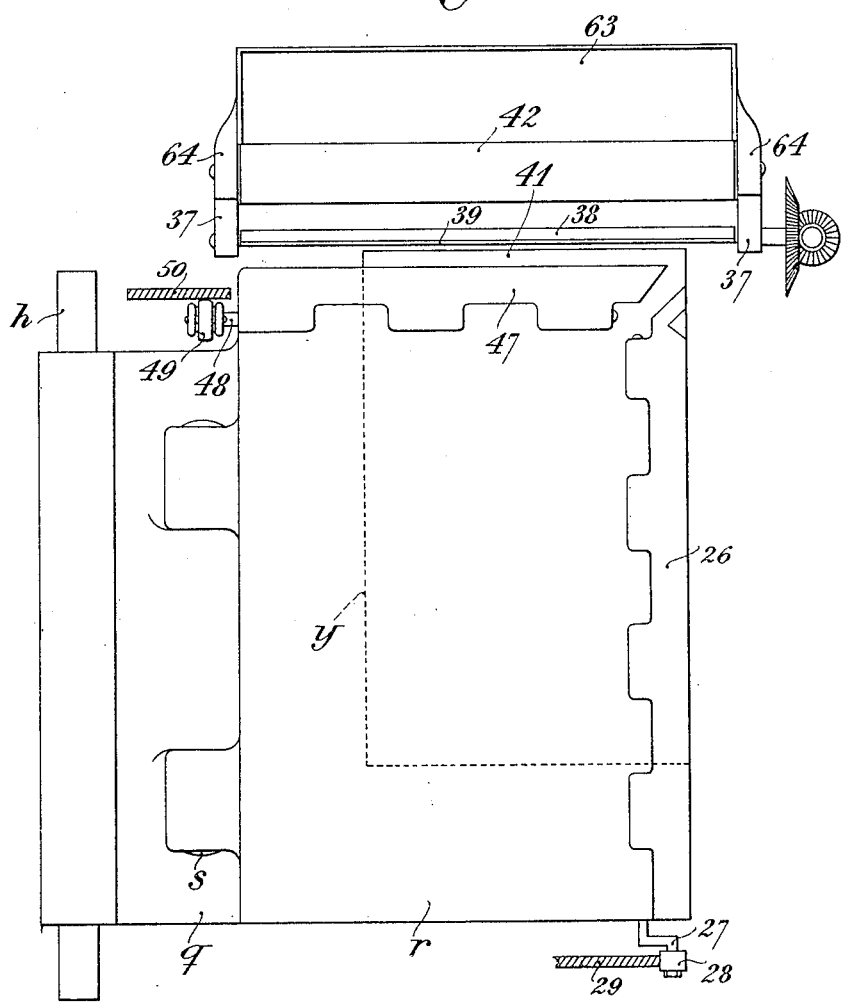

The invention is illustrated on the accompanying drawings in which:

Figure 1 is a side-elevation, with certain portions broken away, of my improved machine for making paper bags and the like, Fig. 2 is an end-elevation of the drum and the carrying devices for the sheets, Fig. 3 is a detail view of the mechanism for applying glue to the side-flap, Figs. 4–7 are detail views showing in different positions the mechanism for making the side-flaps of the bags, Fig. 8 is an end-view of the folding-knife, Figs. 9 and 10 are respectively a transverse section and a rear-elevation of the supporting-plate, Figs. 11 and 12 are respectively a side-elevation and a horizontal section of the mechanism for folding over the bottom-flap, the section being taken nearly on the line A, B in Fig. 1, looking in the direction of the arrows, Fig. 13 is a plan-view of the bottom-flap mechanism and the clamping-plates, Fig. 14 shows the blank from which the bag is made by the machine, Fig. 15 shows the blank after the first folding operation, and Fig. 16 shows the completed bag.

$a$ is the main shaft of the machine driven by means of a belt-pulley $b$ carrying a bevel-wheel $c$ gearing into another bevel-wheel $d$. The latter is firmly connected with a gear-wheel $f$ and the movement is by means of an intermediate gear-wheel $g$ transmitted to a gear-wheel $k$ fixed upon a shaft $h$ which is thereby made to revolve in the direction indicated by the arrow $m$ in Fig. 3. The shaft $h$ has its bearings in the frame $n$ of the machine, and is provided with naves $p$ in which are arranged eight radially fixed plates $q$, and an equal number of plates $r$ capable of moving on pivots $s$ in the naves $p$, Fig. 2.

The pivots $s$ are arranged in such a manner as to allow the movable plates $r$ to be brought into close contact with the fixed plates $q$.

The plates $r$ carry arms $t$ provided with rollers $u$ which latter, during the rotation of the shaft $h$, run on a cam-disk $v$, whereby the plates $r$ at proper points approach or withdraw from the plates $q$. The plates $r$ are pressed against the plates $q$ by means of springs $w$, Fig. 2.

When one set of plates $q$, $r$ points upward the plates are apart and form between them a wedge-shaped space situated just below the rollers $x$ between which the sheet $y$, Fig. 13, from which the bag is to be made is creased the first time along the line $z$, the sheet being pressed down between the rollers $x$ by means of a creaser-plate $l$. The sheet will then be folded as shown in Fig. 14 and falls down into the space between the plates $q$ and $r$ where it is stopped by an adjustable gage 2, Fig. 3, so that the strip 3 which is to be bent in over the one side of the bag, just extends entirely beyond the edge of the plate *q*, while the upper edge of the other side of the bag is just level with the edge of the plate *q*. As soon as the said set of plates *q*, *r* has moved a little to the right, the plate *r* is pressed in against the plate *q*, Fig. 3, in consequence of the form of the cam-disk *v* at this point, and influenced by the spring *w*. The sheet once folded will now be firmly held between the plates *q*, *r* and only the parts of which the side- and bottom flaps are to be made will extend beyond the plate *q*.

A little to the right of the rollers *x*, Fig. 1, a rotating shaft 4 is mounted in the frame *n*, the said shaft carrying a wing 5, Figs. 1 and 3, which during the rotation of the shaft 4 will pass over a glue-roller 6 whereby the glue is transferred to the wing, which then wipes over the strip 3 of the bag extending beyond the edge of the plate *q* whereby the glue is transferred to the said strip. The shaft 4 rotates in the direction illustrated by the arrow 7, and its velocity is adjusted so as to allow the wing 5 to come into contact with all the strips—one after another—protruding from the plates *q*; in the present case the velocity of rotation is eight times that of the shaft *h*. The shaft 4 is moved by means of the gear-wheel *k* gearing into another gear-wheel 8 mounted on the shaft 4. The glue-roller 6 is made to revolve by some suitable means and is continually supplied with glue from a receptacle 60, on the frame *n*, having a bottom-plate 61 which can be adjusted with respect to the roller 6 as the same is gradually worn out, so that the tight contact between the cylindrical surface of the roller and the bottom of the receptacle is always fully retained. When the glue has been transferred to the strip or flap 3 the latter is folded and creased by means of devices described below.

In the frame *n* is mounted a revolving shaft 9, Figs. 1 and 4 to 7, carrying a creaser-plate 10 and an arm 11 provided with a roller 12, the latter running on a cam-disk 13. This cam-disk is made to revolve in the direction indicated by the arrow 14 through gearing operated from the wheel *k*, and revolves at the same speed as the shaft 4.

An arm 16 provided with a comb-shaped supporting-plate 15 is loosely mounted on the shaft 9 and adjacent to the creaser-plate 10, as shown in Fig. 8. The arm 16 is influenced by a spring 18, Fig. 9 inserted between an abutment in the nave of the arm and a pin 17 in the shaft 9. The supporting-plate 15 normally assumes the position shown in Fig. 8 with regard to the creaser-plate 10.

When the cam-disk 13 revolves, the creaser-plate 10 is made to oscillate inasmuch as the roller 12 runs on the said cam-disk, and it is kept pressed against the latter by means of a suitable spring. When the plate *q* assumes the position shown in Fig. 4, the creaser-plate 10 hits the strip 3 and creases it; but, immediately before the creaser-plate hits the strip, the supporting-plate 15 influenced by the spring 18 descends on the latter and helps to keep the bag firmly. The creaser-plate 10 ascends forthwith while the supporting-plate, still under influence of the spring 18, remains for a short while resting on the strip 3, thus preventing the latter from following the creaser-plate 10. As soon as the plate 10 has ascended from the strip 3, a row of fingers 19, Fig. 1, arranged on a shaft 20 rotatably mounted in the frame *n*, are pressed over the strip 3, folding same and simultaneously pressing it against the other side of the bag. The shaft 20 carries an arm 21 provided with a roller 22 running on a cam-disk 24 mounted upon a revolving shaft 23, as shown in Fig. 4. The roller 22 is held against the cam-disk by means of suitable springs. The strip 3 is now bent down over the other side of the bag, and this other side of the bag is now finished. In order to keep the strip 3 in its place, a rock-shaft 25 with a row of fingers 26 projecting into the intervals between the fingers 19, is mounted along the upper edge of each of the plates *r*, the said plates being a little shorter than the plates *q*. The shaft 25 carries an arm 27, Fig. 1, provided with a roller 28 running on a stationary cam-disk 29 and held against same by means of suitable springs. As soon as the roller 28 of the plate *r* has reached the point 30 on the cam-disk 29, Fig. 3, the fingers 26 are swung down over the strip 3 and keep this firmly until the bag falls out from the interval between the plates *q* and *r*.

As mentioned above the strip 3 extends beyond the edge of the plate *q*, and therefore when it is hit by the creaser-plate 10 it must have a support to serve as an impact for the striking of the creaser-plate. Such a support is shown in Figs. 1, 4 and 5 and consists of a curved plate 31 with a slit 32.

The plate 31 is attached to an arm 33 capable of turning on a shaft 34 and carrying another arm 35 provided with a roller 36 which runs on and is held against a cam-disk 55 mounted on the same shaft as the cam-disk 24. The plate 31 thus swings up and down, and the parts are adjusted in such a manner that the slit 32 is level with the plate *q* at the moment when the creaser-plate 10 hits the strip 3, while simultaneously the plate 31 descends with the same speed as the outer edge of the plate *q*. The slit 32 thus forms a striking-guide for the creaser-plate while the part of the plate 31 above the slit, serves to start the creasing of the strip 3. The said part of the plate 31 is comb-shaped and consequently does not impede the movement of the fingers 19.

For the making of the bottom-flap of the bag the following mechanism, Figs. 11, 12, and 13 is used which in all principal features corresponds to the one mentioned above and serving for the making of the side-flap.

To the frame $n$ is attached a bracket 37, in which is mounted a shaft 38 at a right angle with the shaft $h$. This shaft 38 is provided with a glue-wing 39 revolving in the direction indicated by the arrow 40, Fig. 11, and serving to smear the glue on the strip 41 of the bag, which strip extends beyond the side-edge of the plate $q$ and has to be bent in order to form the bottom-flap of the bag. The glue-wing 39 receives the glue from a glue-roller 42, and acts in the same manner as the wing 5 mentioned above. The glue-roller 42 is journaled in bearings 64 adjacent to a glue-receptacle 63 from which it is supplied in the same manner as the glue-roller 9. The glue-wing 39 being at a right angle with the shaft $h$ the glue can be applied along the entire surface of the strip 41. Below the shaft 38, and also at a right angle with the shaft $h$, is mounted a shaft 43 which can be turned to and fro by means of a cam-disk. The shaft 43 carries the end creaser-plate 44 together with a supporting-plate 45 corresponding to the supporting-plate 15 and comb-shaped like this one. The supporting-plate 45 meets the plate $q$ shortly before the creaser-plate 44 hits the strip 41 and serves to hold the bag firmly. As soon as the creaser-plate 44 has struck it is moved back while the supporting-plate 45 remains and prevents the bag from bending upward. When the supporting-plate 45 has ascended, the fingers 46, corresponding to the fingers 19 mentioned above, issue from the frame $n$ and bend the strip 41 in over the bag, while the fingers 47, corresponding to the fingers 26 mentioned before, immediately thereafter press down the strip and hold it firmly until the bag falls out of the machine. The fingers 46 are fixed upon a shaft which is at a right angle with the shaft $h$, and they are moved to and fro by means of an arm running on a revolving cam-disk. The fingers 47 are fixed upon a shaft 48 mounted along the side-edge of the plate $q$ and carrying an arm 49, Fig. 1, provided with a roller running on a stationary cam-disk 50 arranged at the end of the shaft $h$. A fixed plate 51 serves as a striking-guide for the creaser-plate 44, Figs. 11 and 12, which is provided with a slit 52 and is comb-shaped so as not to prevent the movement of the fingers 46. The slit 52 is at a right angle with the shaft $h$. The bag being now provided with bottom-flap, is finished, and when the plate-set $q$, $r$ concerned reaches the position in which the plates are pointing vertically downward, the plate $r$ will be automatically moved away from the plate $q$; the bag is now released so as to fall out of the machine or to be removed from same in some other manner. The plate $r$ remains apart from the plate $q$, as seen in Fig. 1, while the shaft $h$ is turned the other half revolution, and when the plates point vertically upward another folded sheet can fall down between them from the rollers $x$. The plates $r$ and $q$ may also be fixed on to a continuously moving endless band.

Having thus described my invention, I claim as new and desire to secure by Letters Patent:

1. In a bag-making machine, the combination, with a carrying device comprising a pair of hinged plates between which the sheet is grasped, of a gage mounted on one of said plates and having a part projecting into the space between the plates to limit the sheet in its inward movement between the plates.

2. In a machine for making paper bags, the combination of pairs of relatively movable and fixed plates between which the folded sheet is grasped, one of said plates extending beyond the other plate of the same pair at one edge, and folding mechanism adjacent said edge.

3. In a machine for making paper bags, the combination of pairs of relatively movable and fixed plates between which the folded sheet is grasped, one of said plates extending beyond the other plate of the same pair at two edges, and folding mechanism adjacent said edges.

4. The combination, with the rotatably mounted plates between which the sheets are grasped, of means to glue the edge of the sheet which extends beyond said plates, means to crease said edge to form a flap, and means to fold the flap thus formed down on the other edge of the sheet.

5. In a machine for making paper bags, the combination, with devices to carry the sheets in such a manner that the side and bottom edges thereof project beyond such devices, of means to crease such edges to form side and bottom flaps, means to glue such flaps, and means to fold such flaps over on the opposite edges of the sheet.

6. In a machine for making paper bags, the combination of continuously moving, relatively fixed and movable plates between which the folded sheet is grasped, one of said plates being narrower than the other and provided at the edge beyond which the other plate extends with means to hold down the folded edge of the sheet.

7. In a machine for making paper bags, the combination, with the continuously moving, relatively fixed and movable plates between which the folded sheet is grasped, one of said plates being narrower than the other, of means at the edge of the narrower plate to hold down the folded flap of the sheet, means for creasing the sheet at its projecting edge, means for gluing the flap thus formed, means for folding such flap down on the opposite edge of the sheet, and means for actuating said holding means to hold the flap down during the further movement of said plates.

8. In a machine for making paper bags, the combination, with the movable plates between which the folded sheet is grasped, of a creaser-plate which strikes the projecting edge of the sheet and creases the same, and a supporting-plate which holds the sheet against one of said first-named plates during the creasing operation.

9. The combination, with the movable plates between which the folded sheet is grasped, of a pivoted creaser-plate, means to actuate said plate to crease the sheet at its projecting edge, a pivoted supporting-plate to press the sheet against one of said first-named plates after the creaser-plate has struck the sheet, and means to actuate said supporting-plate.

10. The combination, with the means for holding and carrying the folded sheet, of a pivoted creaser-plate, a pivoted supporting-plate, and a common pivot for said plates.

11. The combination, with the sheet-carrying devices, of a creaser-plate 10 to crease the sheet at its projecting edge, and a plate 31 to support the sheet at its projecting edge and which receives the impact of the creaser-plate.

12. The combination, with the devices for carrying the folded sheets, of a creaser-plate, and a supporting-plate to support the sheet at its projecting edge provided with a slit which forms a striking-guide for said creaser-plate.

13. The combination, with the carrying-plates for the folded sheets, of a supporting-plate which extends beneath and supports the edge of the sheet which projects beyond said carrying-plates, said supporting-plate being provided with a striking-guide, a creaser-plate which moves in downward direction and strikes the sheet upon its upper surface above said striking-guide, and a supporting-plate which retains the sheet against one of said carrying-plates during the creasing operation.

In testimony, that I claim the foregoing as my invention, I have signed my name in presence of two subscribing witnesses.

BERNHARDT JOHAN JENSEN.

Witnesses:
 AXEL PERMIN,
 ERNEST BOUTARD.